United States Patent
Wallach

(10) Patent No.: US 7,839,305 B1
(45) Date of Patent: *Nov. 23, 2010

(54) SMART SENSOR SYSTEMS—SUBMARINE MARKING AND SONAR DETECTION

(76) Inventor: Morton L. Wallach, 187 Ledgewood Rd., Apt. 407, Groton, CT (US) 06340

( * ) Notice: Subject to any disclaimer, the term of this patent is extended or adjusted under 35 U.S.C. 154(b) by 0 days.

This patent is subject to a terminal disclaimer.

(21) Appl. No.: 12/389,810

(22) Filed: Feb. 20, 2009

Related U.S. Application Data

(60) Continuation-in-part of application No. 11/769,462, filed on Jun. 27, 2007, now Pat. No. 7,495,572, which is a division of application No. 11/056,023, filed on Feb. 11, 2005, now Pat. No. 7,345,596.

(60) Provisional application No. 60/543,953, filed on Feb. 12, 2004, provisional application No. 60/599,141, filed on Aug. 5, 2004.

(51) Int. Cl.
*G08B 23/00* (2006.01)
(52) U.S. Cl. .................................. 340/984; 367/151
(58) Field of Classification Search .................. 367/93, 367/141, 151; 340/573.6, 541, 933, 943, 340/984
See application file for complete search history.

(56) References Cited

U.S. PATENT DOCUMENTS

| | | | |
|---|---|---|---|
| 4,812,014 A | 3/1989 | Sawano et al. | |
| 4,846,548 A | 7/1989 | Klainer | |
| 4,862,146 A | 8/1989 | McCoy et al. | |
| 5,489,536 A | 2/1996 | Ekekchukwu | |
| 6,130,615 A | 10/2000 | Poteet | |
| 6,170,436 B1 * | 1/2001 | Goodson et al. | 367/139 |
| 6,215,231 B1 | 4/2001 | Newnham et al. | |
| 7,218,235 B1 | 5/2007 | Rainey | |

OTHER PUBLICATIONS

"Sound Absorption Coefficients for some common Material", Web page, last viewed Jan. 16, 2009, http://www.engineerngtoolbox.com/accoustic-sound-absorption-d_68html, The Engineering Tool Box.

"Attenuation coefficient", Web page, last viewed Jan. 16, 2009, http://en.wikikpedia.org/wiki/attenuation_coefficient, Wikipedia, Wikimedia Foundation, Inc., U.S.

"Communication with submarines", Web page, last viewed Jan. 16, 2009, http://en.wikikpedia.org/wiki/attenuation_coefficient, Wikipedia, Wikimedia Foundation, Inc., U.S.

(Continued)

*Primary Examiner*—Thomas J Mullen
(74) *Attorney, Agent, or Firm*—Mark S. Nowotarski

(57) ABSTRACT

An underwater vehicle, such as a submarine or a swimmer/diver, can be detected by seeding a volume of water with neutrally buoyant, acoustically reflective sensors. The sensors comprise a sonar reflective coating and an adhesive so that they stick to and mark said vehicle when said vehicle or swimmer/diver passes through said volume of water. A sonar detector scans the water to identify the presence of said vehicle or swimmer/diver by observing acoustic reflections from the sensors adhering to the vehicle or swimmer/diver.

17 Claims, 4 Drawing Sheets

OTHER PUBLICATIONS

"Sonar", Web page, last viewed Jan. 16, 2009, http://en.wikikpedia.org/wiki/Sonar, Wikipedia, Wikimedia Foundation, Inc., U.S.

"Target strength", Web page, last viewed Jan. 16, 2009, http://en.wikikpedia.org/wiki/Target_strength, Wikipedia, Wikimedia Foundation, Inc., U.S.

"Underwater acoustics", Web page, last viewed Jan. 16, 2009, http://en.wikikpedia.org/wiki/Underwater_acoustics, Wikipedia, Wikimedia Foundation, Inc., U.S.

"United States Navy ships", Web page, last viewed Jan. 16, 2009, http://en.wikikpedia.org/wiki/United_States_Navy_ships, Wikipedia, Wikimedia Foundation, Inc., U.S.

"Coating Methods", Kirk-O-Othner, Encyclopedia of Chemical Technology, vol. 3, $4^{th}$ Ed, pp. 765-833, 1993.

* cited by examiner

US 7,839,305 B1

SMART SENSOR SYSTEMS—SUBMARINE MARKING AND SONAR DETECTION

CROSS-REFERENCE TO RELATED APPLICATION

This application is a continuation-in-part of US nonprovisional patent application "Smart Sensor Systems—Swimmer Detection", Ser. No. 11/769,462 (now U.S. Pat. No. 7,495,572), filed Jun. 27, 2007. Said application is incorporated herein by reference.

Said application Ser. No. 11/769,462, (U.S. Pat. No. 7,495,572) in turn, is a divisional of US nonprovisional patent application "Smart Polymeric Multilayer Sensors", Ser. No. 11/056,023, (now U.S. Pat. No. 7,345,596) filed Feb. 11, 2005. Said nonprovisional patent application Ser. No. 11/056,023 is incorporated herein by reference.

Said nonprovisional patent application Ser. No. 11/056,023, (U.S. Pat. No. 7,345,596) in turn, claims the benefit of U.S. provisional patent application Ser. No. 60/543,953, filed Feb. 12, 2004, and entitled "Smart Polymeric Multilayer Sensors". Said provisional application Ser. No. 60/543,953 is incorporated herein by reference.

Said nonprovisional patent application Ser. No. 11/056,023 (U.S. Pat. No. 7,345,596) also claims the benefit of U.S. provisional patent application Ser. No. 60/599,141, filed Aug. 5, 2004, and entitled "Surface Swimmer Detection Via Sensors". Said provisional application Ser. No. 60/599,141 is incorporated herein by reference.

The instant application further incorporates by reference U.S. provisional patent application Ser. No. 60/455,142, filed Mar. 17, 2003, and entitled "Smart Polymeric Multilayer Sensors".

FIELD OF INVENTION

This invention is in the field of methods for detecting and tracking a submarine.

BACKGROUND

An improved low cost method of detecting submarines is needed.

SUMMARY OF THE INVENTION

The Summary of the Invention is provided as a guide to understanding the invention. It does not necessarily describe the most generic embodiment of the invention or all species of the invention disclosed herein.

The present invention comprises sensors that are in the form of multilayer polymer micro beads or other shapes and are about nanometers to centimeters in diameter. Said multilayer beads are acoustically reflective and further comprise an outer adhesive layer.

The beads or other shapes may be used to detect a submarine or other moving underwater object by being distributed in a given volume of water. If a submarine passes through said volume of water, one or more beads will mark the submarine by adhering to it, thus making it more easily detectable by sonar.

DETAILED DESCRIPTION OF INVENTION

The following detailed description discloses various embodiments and features of the invention. These embodiments and features are meant to be exemplary and not limiting.

The present invention comprises sensors that are in the form of multilayer beads.

Figure 1:
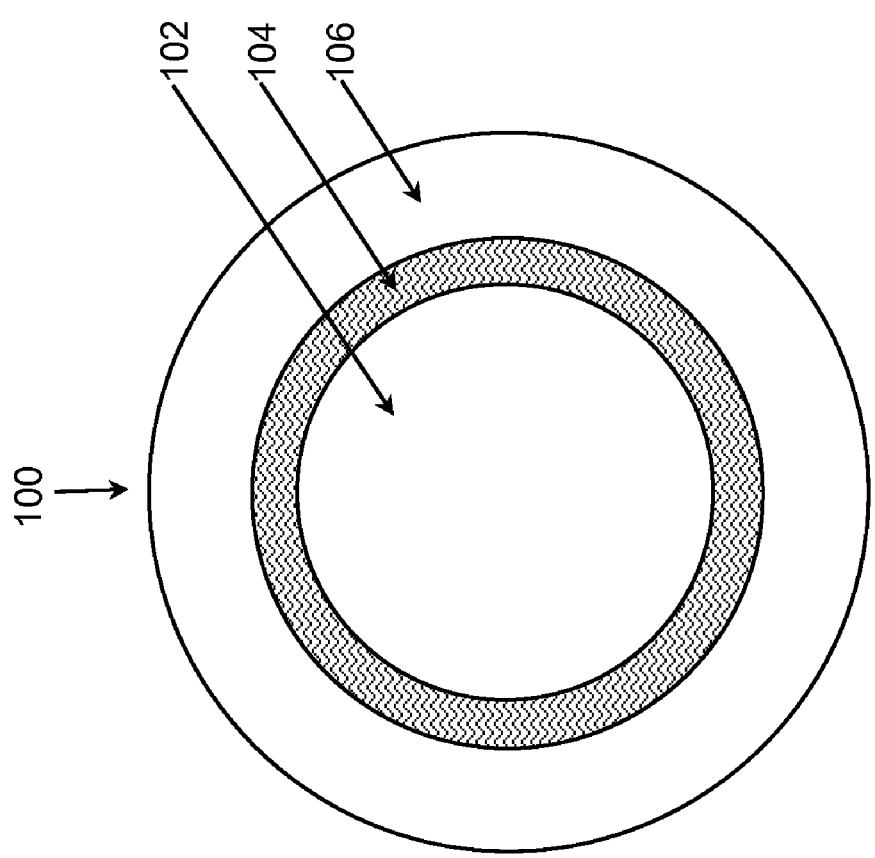
FIG. 1 is a cross section of a typical three-layer sensor bead.

FIG. 1 illustrates the cross section of an exemplary sensor structure. Sensor 100 is generally spherical in shape. The sensor comprises a core 102, intermediate layer 104 and outer layer 106.

Sensors may have an overall diameter in the range of a few nanometers to a few centimeters.

Sensors may also have nonspherical shapes, such as woven swatches or uniform sheets. Swatches or sheets can be as large as a meter across. They can be sufficiently stiff so that they will remain open in normal water currents. They can be sufficiently flexible so that they conform to the local curvature of a submarine hull should they come in contact with one traveling at typical patrolling speeds. The sheet would conform to the hull shape and remain in that shape due to glue adhesion to the hull. A sheet with the stiffness of a piece of cardboard would also meet both criteria.

A typical sheet sensor can be 5×8×0.5 cm of polypropylene core with a very thin metal coating, top coated with adhesive, such as water soluble polyvinyl alcohol (PVOH). Such an adhesive can be tailored to dissolve over time at a desired temperature consistent with the water temperature in a given region.

Sensors are typically made from polymers. Suitable polymers depend upon the application. Examples of suitable polymers include polyethylene, polypropylene, acrylics, and vinyls.

Biodegradable polymers such as poly(lactic acid) and aliphatic polyesters may also be used in selected applications. Biodegradable polymers may be used so that sensors do not foul an ecosystem and so that a sensor barrier (see below) will disappear over time. Biodegradability can be from days to months depending on the microbe content of the medium that said sensors are distributed in and the desired service life of a sensor.

Sensors may comprise metals. Said metals can be Ag, Au, Ti, Ni, Al, Cu, mixtures or coatings thereof or other metals depending on the application. Metals can be employed as alloys, compounds, or in layered combination with polymers. The metal coating will enhance the ability of a given target to reflect acoustic signals. Hence when marked on a submarine, the target strength is enhanced.

A shell can be coated onto a core. Alternatively, a core/shell can be polymerized as a core/shell structure.

Sensors may be made by known means for producing multilayer coatings. These known methods include the methods described in the Kirk-Othmer Encyclopedia of Chemical Technology, 4*th* Edition, New York: Wiley, 1993, volume 6, pages 606 to 669. Said pages are incorporated herein by reference.

Depending on the application, the outer layer can be a protective layer, reactive layer, adhesive layer or shedding layer. Said adhesive layer may be labile in salt water such that said sensor will initially stick to an object and then become unstuck from said object when the adhesive degrades over a desired time period. Thus an object may leave a trail of sensors behind it. A polyvinyl alcohol (PVOH) glue has these properties. It will be initially sticky but will slowly dissolve into water. The glue can be designed to dissolve over a period of hours to days.

Sensors may be designed to be neutrally buoyant when distributed in a given fluid. They may be neutrally buoyant over a range of depths from surface to 2000 feet or more. Sensors that float near the surface will have a relatively low density. Sensors that float at greater depths will have a relatively higher density. Small hollow glass spheres can be incorporated into the sensors to adjust their overall buoyancy.

The compressibilities of sensors comprised of polymeric materials mentioned herein are lower than the compressibility of water or salt water. As a result, these sensors will be relatively stable hovering at depth where the water density is equal to the sensor density.

Marked sensors may be designed to become buoyant over time. A "marked sensor" is a sensor that adheres to an object. Thus an initially neutrally buoyant sensor that has a PVOH glue coating (where the density is >1.05 g/cc)—which is greater than the density of salt water—will become less dense over time as the PVOH glue dissolves off. This property can be used to track submarines. If the sensor were stuck to a submarine, the sensor would fall off over time as the glue dissolved. The sensor would then float to the surface where it could be detected by a monitor, such as on an aircraft. If the sensor also comprised a partial fluorescent coating then it would be visible at great distance upon illumination by an appropriate frequency laser. The fluorescent coating might, for example, be fluorescent in the IR band and would be visible to an IR camera upon interrogation by an IR laser. A small amount of IR active coating may be placed on the metal coating. Alternatively, the IR laser used could be at a wavelength that is preferentially reflected by the metal coating.

Sensors may comprise 1, 2, 3 or more layers wherein the core is considered to be a layer. The number of layers may depend upon the application.

Submarine Detection

Figure 2:
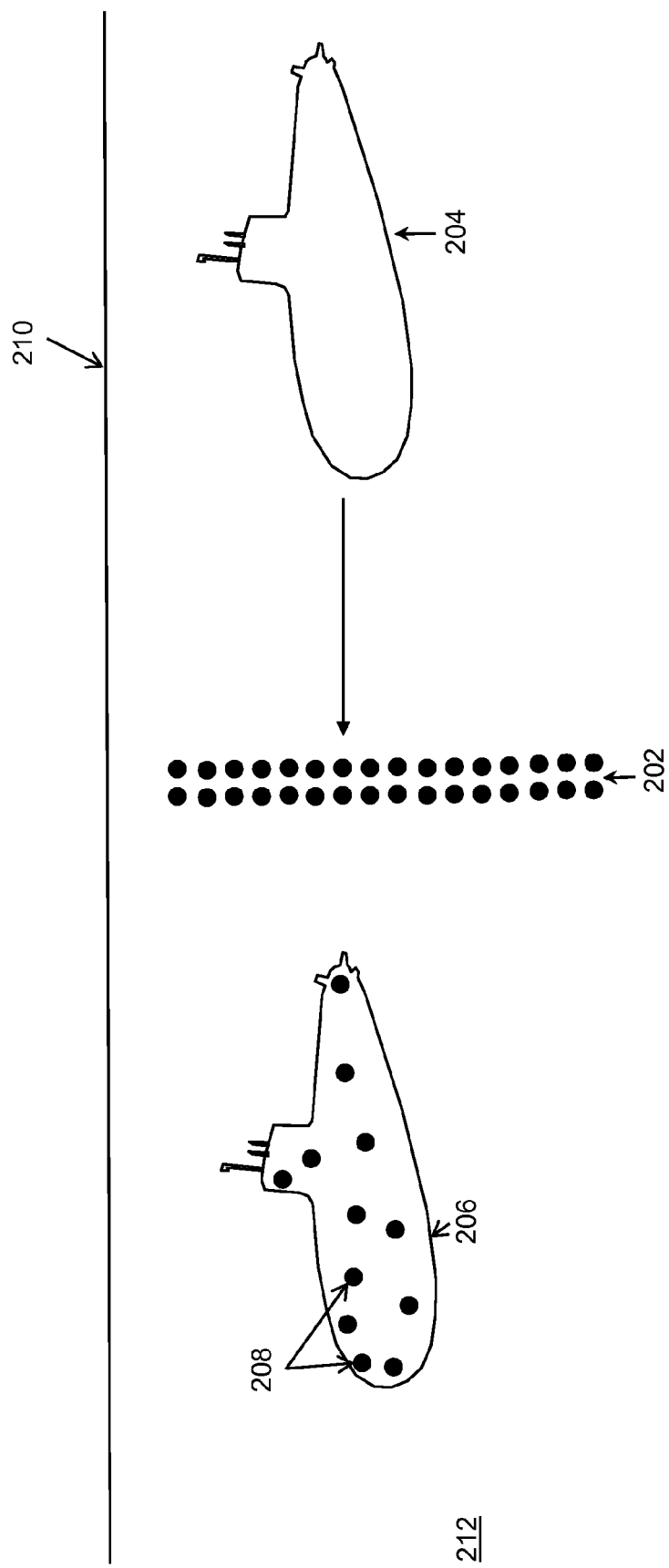
FIG. 2 illustrates the use of a field of sensors to mark an intruder submarine.
Figure 3A:
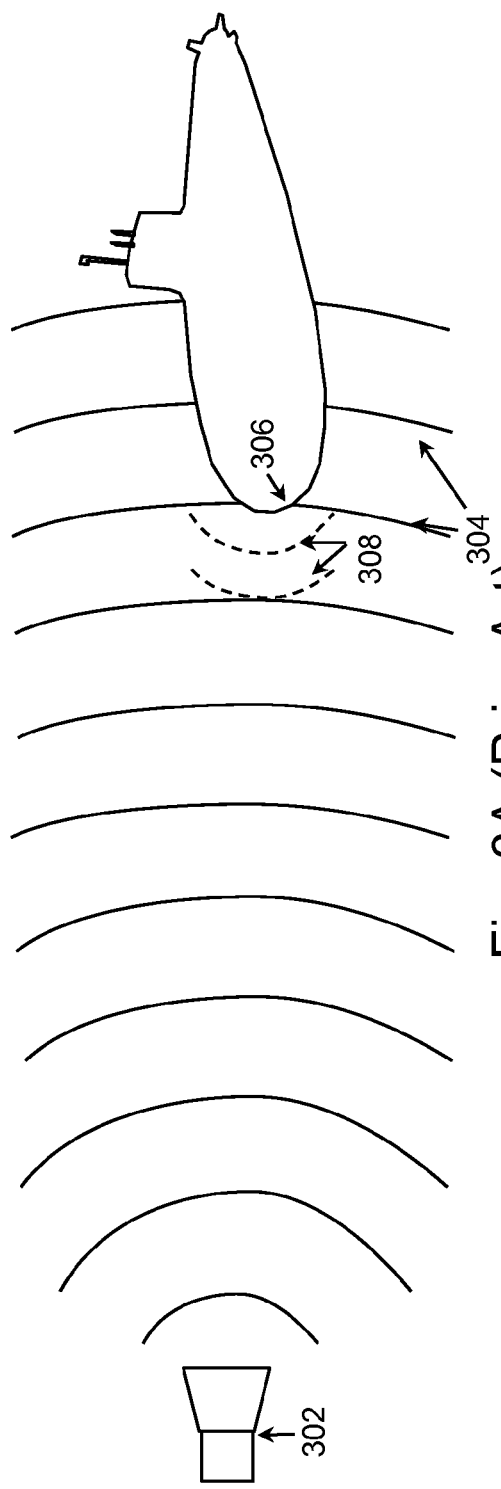
FIG. 3A illustrates how a submarine hull normally absorbs sonar so that it is difficult to detect thereby.
Figure 3B:
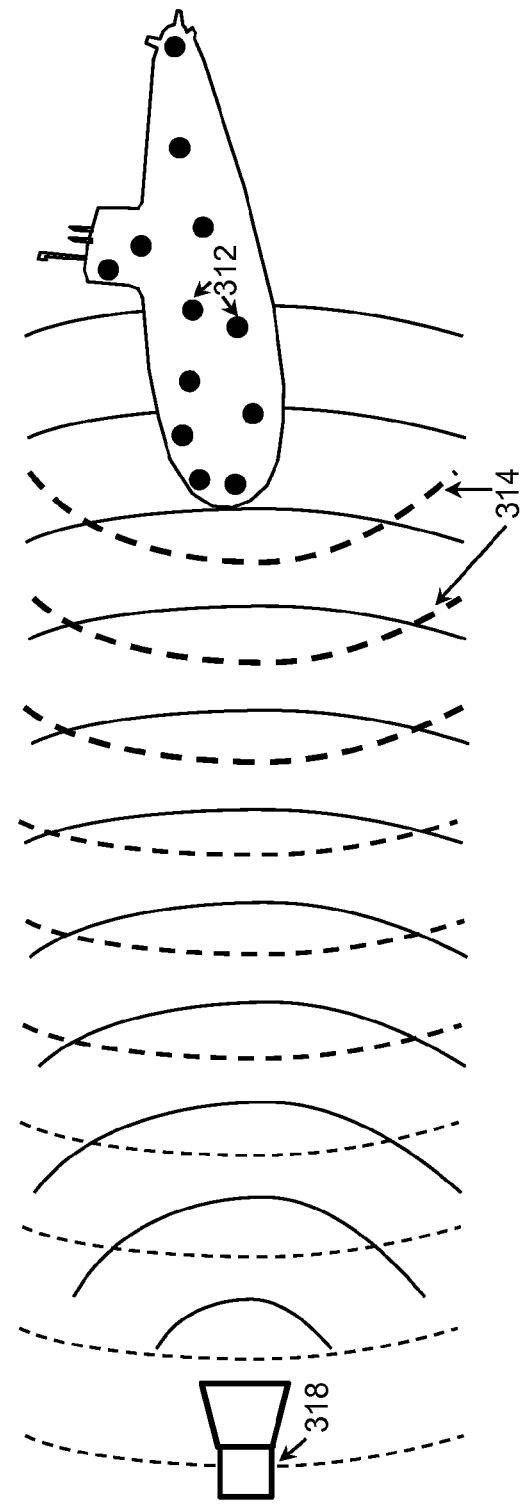
FIG. 3B illustrates how marking a submarine hull with the sensors described herein reduces the hull's absorption of sonar, increases reflectivity, and thus makes it more easily detectible.

FIGS. 2, 3A and 3B illustrate a method of submarine detection using the inventive sensors. Similar methods can be used to detect surface water craft.

A multiplicity of sensors 202 are seeded in a volume of water 212. The sensors are deployed from just below the surface 210 of the water to a depth of 1000 feet. The sensors comprise three layers.

Table 1 presents an exemplary embodiment having a range of thicknesses of said layers that are suitable for submarine detection and tracking. Column 1 identifies the layer. Column 2 shows the range of suitable thicknesses. Column 3 shows the activity of the layer.

TABLE 1

Sensor Layers for Submarine Detection and Tracking

| Layer | Thickness | Activity/Function |
|---|---|---|
| Overall sensor | 10 nm-10 cm | Detection of submarine/Increased acoustic range |
| Outer layer | 1 nm-3,000 μm | Adhesive layer/Mark submarine |
| Intermediate layer | 1 nm-3,000 μm | Acoustic reflective metal layer/Detect submarine |
| Core | 1 nm-3,000 μm | Substrate adjusted for neutral buoyancy at a given depth/Formation of barrier |

A sensor may have a spherical shape with a diameter in the range of 100 nm to 10,000 μm.

Alternatively, a sensor may have a flat shape. Said flat shape may be a square or rectangle with edge lengths in the range of 1 micron to 10 cm. The total thickness may be 15,000 μm or less.

A flat sensor may have a woven core or film or sheet composite structure.

A sensor may comprise an outer layer. A suitable thickness of said outer layer is in the range of 100 nm to 2,500 μm.

Said outer layer may comprise an adhesive. Said adhesive may comprise a cyanoacrylate, vinyl alcohol, phenolic or other water suitable adhesive. The adhesive may be labile in salt water such that its stickiness will degrade over time. One can employ a single of such adhesive or a mixture of adhesives with different time periods to release from the ship hull.

A sensor may comprise an intermediate layer. A suitable thickness for said intermediate layer is in the range of 100 nm to 5,000 μm. The intermediate layer may comprise a metal, such as copper or silver. The metal layer renders the sensor more "visible" and reflective of sonar. Typically such metal coatings can be applied by electrochemical deposition techniques, such as electroless plating.

The sensor may further comprise a core. The core is designed such that a given sensor is neutrally buoyant with respect to water at a given depth. A plurality of sensors may be deployed with a range of buoyancies such that the sensors 202 distribute themselves over a given range of depths forming a "barrier". A suitable range of depths is ½ foot to 1000 feet.

An intruder submarine 204 shown in FIG. 2 that comes in contact with said sensors 202 will have one or more of said sensors adhere to its hull 206 as depicted at 208.

The metal coating will enhance the ability of a given target to reflect acoustic signals. Hence when a sensor is marked on a submarine, the target strength is enhanced. The intruder submarine will then become visible to sonar over a greater distance.

FIGS. 3A and 3B illustrate how the sensors adhering to a submarine hull can increase said submarine's visibility to sonar. In FIG. 3A, a normal submarine hull 306 is "pinged" 304 by a sonar system 302. The submarine hull, however, is typically coated with a material that absorbs acoustic energy. Hence, very little of the incident acoustic energy is reflected 308 and the submarine goes relatively undetected.

FIG. 3B shows that a hull with a sonar reflective sensor 312 adhered to it, will reflect substantially more acoustic energy 314 which then becomes more readily detectable at greater distance by the sonar system 318.

Similar principles apply to passive sonar systems which may reverberate off the marked hull. The source of acoustic energy then becomes natural or incidental reverberative sources and noise in the given environment of the submarine.

The total sound absorbed by a given section of the submarine surface is:

$$A = (S_o - S_x) * a_o + S_x * a_x$$

Where A is the absorption for a given area (m² Sabine)

$S_o$ = the total area of the surface (m²)

$S_x$ = the area covered by the sensors (m²)

$a_o$ is the acoustic absorption coefficient of the submarine hull $a_x$ is the acoustic absorption coefficient of the sensors The reflectivity R of a surface is defined as (1−A).

Figure 4:
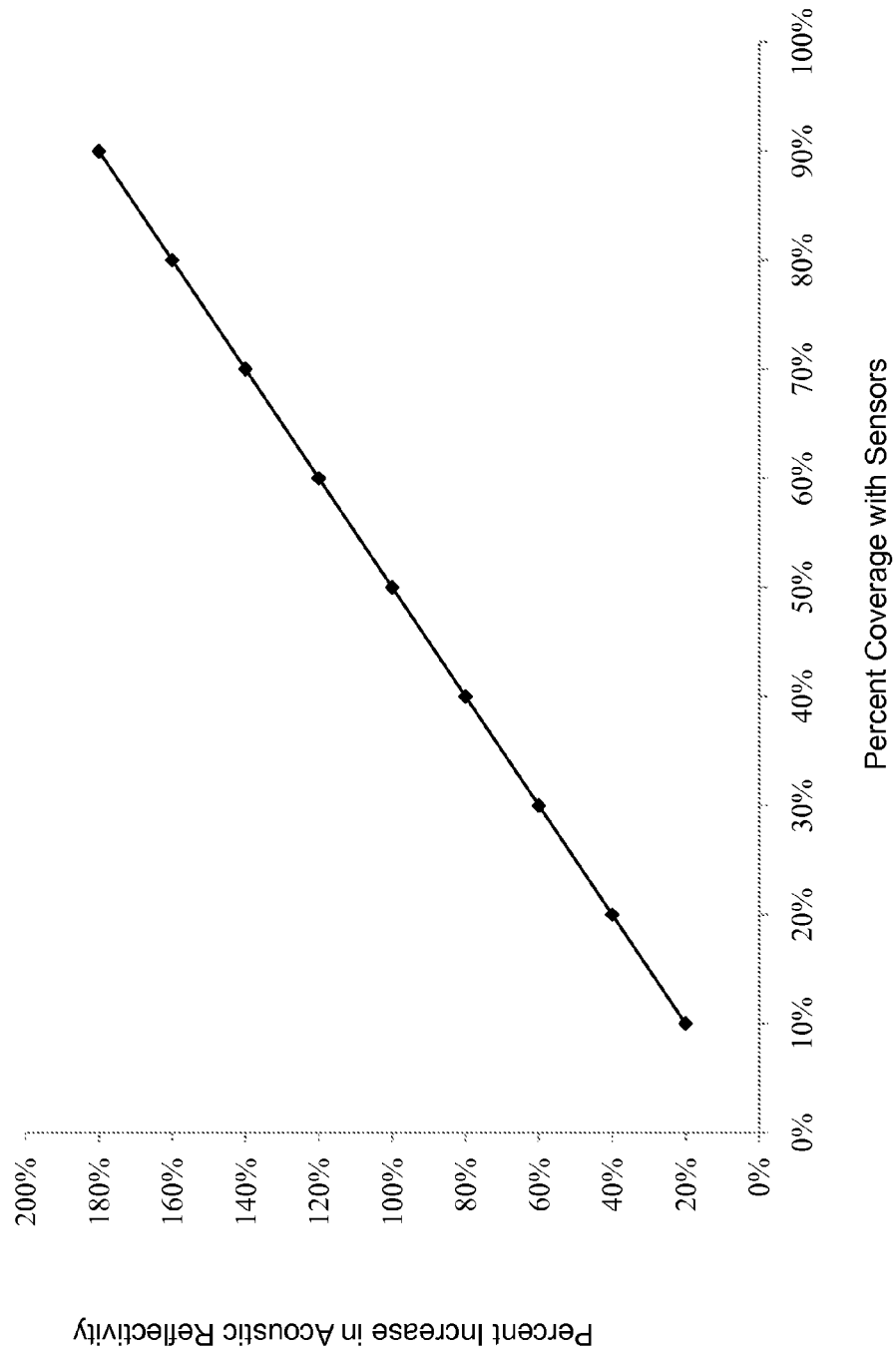
FIG. 4 is a graph showing the increase in acoustic reflectivity of a submarine hull versus level of coverage of smart polymeric sensors adhered to it.

A submarine designed for sonar stealth might have a hull coating with an acoustic absorption coefficient of 0.7 at expected sonar interrogation frequencies. The metal coated sensors, however, might have an absorption coefficient of 0.2 or less. Thus the amount of acoustic energy reflected by a hull would increase dramatically after a relatively small fraction of the hull were coated with these sensors. Table 2 gives an estimate of the reflectivity R of a section of submarine hull as it becomes increasingly covered with sensors with an absorption coefficient of 0.1 which is characteristic of a metal coating. This data is also presented graphically in FIG. 4.

TABLE 2

| Percent Coverage of a Given Area with Sensors | Reflectivity | Increase in Reflectivity |
|---|---|---|
| 10% | 0.36 | 20% |
| 20% | 0.42 | 40% |
| 30% | 0.48 | 60% |
| 40% | 0.54 | 80% |
| 50% | 0.60 | 100% |
| 60% | 0.66 | 120% |
| 70% | 0.72 | 140% |
| 80% | 0.78 | 160% |
| 90% | 0.84 | 180% |

Thus, for only a 20% coverage of a given area with sensors, the detectible signal from the submarine can be increased by 40%.

Example 1

An underwater vehicle enters a key asset port area. It comes in contact with neutrally buoyant, adhesive coated, and sonar reflective marking sensors with a =0.1 deployed along a water column at a significant distance from the port security detection system. The water column is at least one fourth mile across. The sensors adhere to the vehicle's hull which has a typical, originally designed a =0.7. Hence the reflected signal is enhanced about 20% with only 10% sensor coverage per unit area and is more readily detected at longer distances. The enhancement is particularly useful in detectability in view of the inverse square law which substantially decreases the signal at distance. So that if X is the distance to target and Y is the initial signal strength then the detectable signal strength at distance is increased to $Y(1+20\%)/X^2$ from $Y/X^2$. The range and bearing can then be determined as said vehicle proceeds on its course.

The sensors are spherical core/shell polymeric material about 6 mm in diameter with a clear, acoustically transparent PVOH adhesive outer layer, coated on an intermediate layer of a sonar reflective metallic coating.

The core is a low density polymer.

On acoustic incidence, the sonar reflective sensors which mark the vehicle's hull reflect a stronger and more readily detectable acoustic signal. This is sensed by a port hydrophone array providing passive acoustic detection (via standard piezoelectric transducer). The hydrophone system relays the information to a control area and sets off an alarm for security action.

Example 2

A small diesel intruder submarine approaches a protected asset in open water. The captain of the intruder submarine is informed that its hydrophone equipment has recorded an acoustic signal. Unknown to him, his submarine has just passed through a seeded field of sonar reflective sensors which have adhered to his ship and provided a reflection of the impinging signal.

The sensors comprise an outer adhesive layer.

They further comprise an intermediate layer. The intermediate layer comprises metal.

The returned reflective signal is recorded by a patrolling submarine which had been broadcasting from its active sonar. The patrolling submarine determines the range and bearing to said intruder and then begins to approach it.

The intruding diesel submarine quickly maneuvers to try to avoid being detected and the captain is puzzled by being discovered so easily from what he considered a reasonably safe distance from the asset. Actually, the reflected intensity from his boat is much stronger than ordinary. As a result, detection by the asset patrolling submarine has been made at a much further distance than expected.

Example 3

Underwater divers wearing bubbleless pure-oxygen rebreathing air supplies approach a port area at night. They are swimming at a maximum depth of 33 feet to avoid oxygen toxicity.

They pass through a barrier of 10 mm square acoustically reflective woven sensors which adhere to their black suits and flippers. The sensors in the barrier are distributed from the surface to a depth of 500 feet. The metal layer in the sensors is black anodized aluminum so that the sensors have very low visibility and are not easily seen by the divers.

Passive sonar detectors on the sea floor pick up acoustic reflections from the divers when they pass overhead. Port security is dispatched to interdict the divers.

The invention claimed is:

1. A sensor for increasing the detectability of an underwater object, said sensor comprising:
   a. an outer adhesive layer;
   b. an acoustically reflective layer; and
   c. a core of polymeric material;
   wherein said sensor is neutrally buoyant at a given depth of water.

2. The sensor of claim 1 wherein said acoustically reflective layer comprises a metal.

3. The sensor of claim 2 wherein said metal is either silver, copper, titanium, nickel or mixtures thereof.

4. The sensor of claim 1 wherein said sensor is flat composite film, sheet, or cloth.

5. The sensor of claim 4 wherein said sensor is up to 1 meter across.

6. The sensor of claim 1 wherein said sensor is spherical and the diameter of said sensor is less than 5000 μm.

7. The sensor of claim 1 wherein said given depth of water is in the range of ½ to 2000 feet and wherein said water is sea water.

8. The sensor of claim 1 wherein said underwater object is moving.

9. A method for detecting an underwater object in a given volume of water, said method comprising the steps of:
   a. broadcasting an acoustic signal in said volume of water, said volume of water having been seeded with one or more sensors, each of said one or more sensors comprising:
      i. an outer adhesive layer;
      ii. an acoustically reflective layer; and
      iii. a core of polymeric material;
         wherein each of said sensors is neutrally buoyant at a given depth of water; and
   b. receiving acoustic reflections of said acoustic signal from at least one marked sensor, said marked sensor being one of said one or more sensors, such that said acoustic reflections can be analyzed to detect the presence of said underwater object.

10. The method of claim 9 further comprising the step of determining the range and bearing of said object.

11. The method of claim 9 wherein said given depth of water is in the range of ½ to 2000 feet and wherein said one or more sensors have a range of buoyancies such that they will distribute themselves over a depth of ½ to 2000 feet of water.

12. The method of claim 9 wherein said object is a submarine and wherein said sensors have an acoustic absorption coefficient of 0.2 or less.

13. The method of claim 9 wherein said object is a swimmer or a diver and wherein said given depth of water is in the range of 0 to 500 feet of water.

14. The method of claim 9 wherein said underwater object is moving.

15. A method for marking an underwater object in a given volume of water, said method comprising the step of:
   a. distributing one or more sensors in said given volume of water, said sensors comprising:
      i. an outer adhesive layer;
      ii. an acoustically reflective layer; and
      iii. a core of polymeric material;
   wherein each of said one or more sensors is neutrally buoyant at a given depth of water, said given depth of water being in the range of 0 to 2000 feet.

16. The method of claim 15 wherein said given volume of water is at least one-fourth of a mile across.

17. The method of claim 15 wherein the object is moving.

* * * * *